United States Patent
Zhang et al.

(10) Patent No.: US 10,171,547 B2
(45) Date of Patent: Jan. 1, 2019

(54) NEIGHBOR DISCOVERY FOR IPV6 SWITCHING SYSTEMS

(71) Applicant: Cisco Technology, Inc., San Jose, CA (US)

(72) Inventors: Ming Zhang, San Jose, CA (US); Chengelpet Ramesh, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 623 days.

(21) Appl. No.: 14/264,101

(22) Filed: Apr. 29, 2014

(65) Prior Publication Data

US 2014/0229573 A1   Aug. 14, 2014

Related U.S. Application Data

(62) Division of application No. 13/270,904, filed on Oct. 11, 2011, now Pat. No. 8,713,169.

(51) Int. Cl.
| | |
|---|---|
| *G06F 15/16* | (2006.01) |
| *H04L 29/08* | (2006.01) |
| *H04L 12/931* | (2013.01) |
| *H04L 12/751* | (2013.01) |
| *H04L 29/12* | (2006.01) |

(52) U.S. Cl.
CPC ............ *H04L 67/02* (2013.01); *H04L 45/026* (2013.01); *H04L 49/50* (2013.01); *H04L 61/6059* (2013.01)

(58) Field of Classification Search
CPC ............................... H04L 67/02; H04L 49/50
See application file for complete search history.

(56) References Cited

U.S. PATENT DOCUMENTS

| | | | |
|---|---|---|---|
| 7,103,035 | B1 | 9/2006 | Kanuri |
| 8,112,803 | B1 | 2/2012 | Satish et al. |
| 8,713,169 | B2 | 4/2014 | Zhang et al. |
| 2002/0035639 | A1 | 3/2002 | Xu |
| 2002/0129086 | A1 | 9/2002 | Garcia-Luna-Aceves et al. |
| 2003/0158906 | A1 | 8/2003 | Hayes |
| 2005/0038907 | A1 | 2/2005 | Roeder et al. |
| 2005/0086367 | A1 | 4/2005 | Conta et al. |
| 2005/0237946 | A1 | 10/2005 | Borowski |
| 2005/0265328 | A1 | 12/2005 | Bettink |
| 2006/0039374 | A1 | 2/2006 | Belz et al. |
| 2006/0280192 | A1 | 12/2006 | Desanti |

(Continued)

OTHER PUBLICATIONS

U.S. Official Action dated Nov. 14, 2014 cited in U.S. Appl. No. 13/247,497, 39 pgs.

(Continued)

*Primary Examiner* — Hua Fan
(74) *Attorney, Agent, or Firm* — Merchant & Gould P.C.

(57) ABSTRACT

A distributed neighbor discovery module is disclosed where all neighbor discovery operations and functionalities may be distributed to a switch device processor. Each neighbor discovery process on a switch device may run as an individual neighbor discovery router node. There may be no coordination between neighbor discovery processes occurring on different switch devices. All other traffic, including both IPv6 control traffic and data traffic destined to the router may be processed by the central controller processor.

18 Claims, 14 Drawing Sheets

(56) References Cited

U.S. PATENT DOCUMENTS

| | | | |
|---|---|---|---|
| 2008/0043614 A1* | 2/2008 | Soliman | H04W 8/065 370/208 |
| 2008/0165783 A1* | 7/2008 | Desanti | H04L 63/06 370/392 |
| 2008/0298277 A1* | 12/2008 | Singh | H04L 12/2801 370/255 |
| 2010/0046524 A1 | 2/2010 | Rune et al. | |
| 2011/0044351 A1 | 2/2011 | Punati et al. | |
| 2011/0294943 A1 | 12/2011 | Du et al. | |
| 2012/0069845 A1 | 3/2012 | Carney et al. | |
| 2012/0166798 A1 | 6/2012 | Perez | |
| 2012/0287786 A1 | 11/2012 | Kamble et al. | |
| 2012/0294166 A1 | 11/2012 | Punati et al. | |
| 2013/0003727 A1 | 1/2013 | Ramaraj et al. | |
| 2013/0067043 A1 | 3/2013 | Gaitonde et al. | |
| 2013/0077530 A1 | 3/2013 | Zhang et al. | |
| 2013/0091269 A1 | 4/2013 | Zhang et al. | |

OTHER PUBLICATIONS

U.S. Official Action dated Apr. 8, 2015 cited in U.S. Appl. No. 13/247,497, 43 pgs.
U.S. Official Action dated Jul. 27, 2015 cited in U.S. Appl. No. 13/247,497, 48 pgs.
Chinese First Office Action dated Nov. 27, 2015 cited in Application No. 201280049912.7, 13 pgs.
U.S. Official Action dated Jul. 9, 2014 cited in U.S. Appl. No. 13/247,497, 42 pgs.
Chinese Second Office Action dated Jul. 13, 2016 cited in Application No. 201280049912.7, 12 pgs.
Chinese Third Office Action dated Nov. 11, 2016 cited in Application No. 201280049912.7, 12 pgs.
U.S. Appl. No. 13/247,497, filed Sep. 28, 2011, entitled "Scaling IPv6 on Multiple Devices Virtual Switching System with Port or Device Level Aggregation," Inventor: Zhang et al.
U.S. Official Action dated Oct. 7, 2013 cited in U.S. Appl. No. 13/270,904, 18 pgs.
Kumari et al.: "Operational Neighbor Discovery Problems, draft-gashinsky-v6ops-v6nd-problems-00.txt," Internet Engineering Task Force, IETF; Standardworkingdraft, Internet Society (ISOC) 4, Rue Des Falaises CH-1205 Geneva, Switzerland, Oct. 6, 2011, pp. 1-12.
Dugal et al., "Protecting the Router Control Plane, rfc6192.txt," Internet Engineering Task Force, IETF; Standard, Internet Society (ISOC) 4, Rue Des Falaises CH-1205 Geneva, Switzerland, Mar. 31, 2011, pp. 1-25.
Partial International Search Report dated Dec. 11, 2012 in Application No. PCT/US2012/059293, 5 pages.
European Office Action dated Jul. 2, 2015 cited in Application No. 12 778 780.9, 5 pgs.
European Office Action dated Mar. 21, 2016 cited in Application No. 12 778 780.9, 6 pgs.
Chinese Fourth Office Action dated Feb. 22, 2017 cited in Application No. 201280049912.7, 8 pgs.
European Summons to Attend Oral Proceedings dated Apr. 7, 2017 cited in Application No. 12778890.9, 6 pgs.

* cited by examiner

NEIGHBOR DISCOVERY FOR IPV6 SWITCHING SYSTEMS

CROSS-REFERENCE TO RELATED APPLICATION

This application is a divisional of U.S. patent application Ser. No. 13/270,904, filed Oct. 11, 2011, now U.S. Pat. No. 8,713,169, issued Apr. 29, 2014, which is entirely incorporated herein by reference.

BACKGROUND

Neighbor discovery protocol is used by IPv6 protocol for router discovery, address resolution, duplicated address detection, unreachability detection, and other features. On a switching module capable of supporting a large number of virtual machines and/or hosts, as the number of hosts/virtual machines grows, the amount of neighbor discovery messages exchanged between hosts and a central controller processor may be overwhelming. This can potentially overload the central controller processor and increase the possibility of failures.

As such, there exists a need for an IPv6 neighbor discovery distribution module that can distribute the neighbor discovery traffic to the various switching devices. This may allow for an increase in scalability and stability for switching modules capable of supporting a large number of virtual machines and/or hosts.

BRIEF DESCRIPTION OF THE DRAWINGS

The accompanying drawings, which are incorporated in and constitute a part of this disclosure, illustrate various embodiments. In the drawings.

DESCRIPTION OF EXAMPLE EMBODIMENTS

Overview

Figure 1:
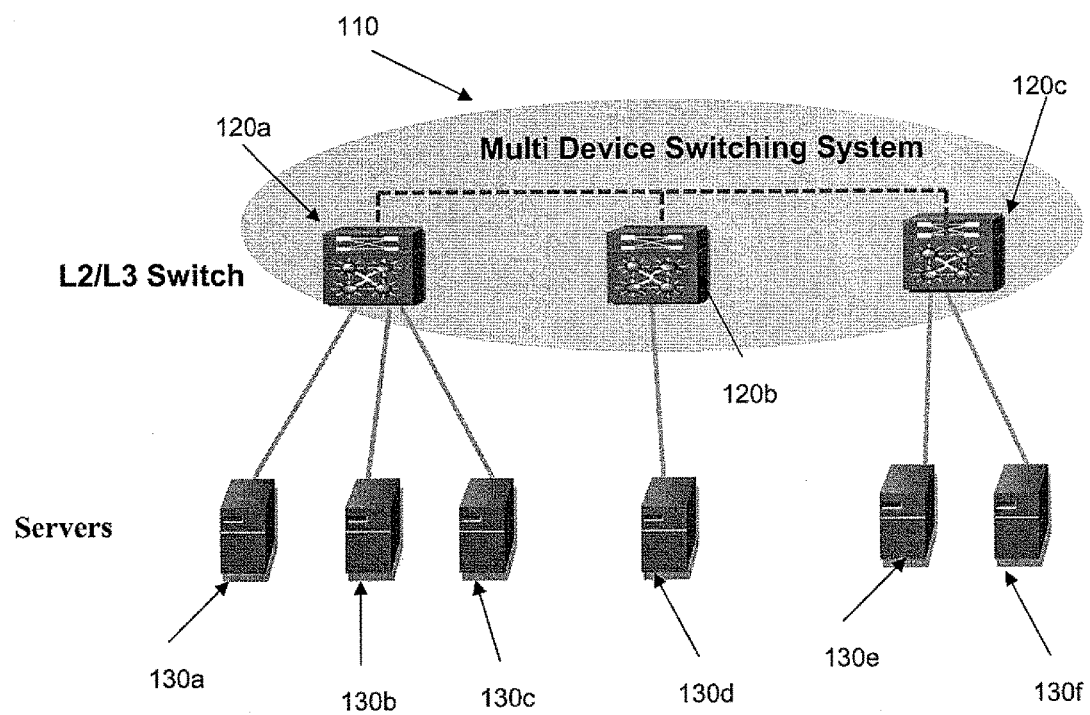
FIG. 1 illustrates an example network environment for embodiments of this disclosure.

Consistent with embodiments of the present disclosure, systems and methods are disclosed for resolving a critical scalability issue for multiple switch device systems with VLANs spanning across multiple devices.

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

As the virtual machine ("VM") concept is introduced into campus and data center networks, the number of hosts connected by switching systems at the data center grows dramatically, even in the order of millions. Traditional three-tier network architectures can no longer meet the requirements of these types of networks as more and more switches and routers must be added as the number of VMs grow. Latency, complexity, and cost may increase as well.

FIG. 1 illustrates an example network environment for embodiments of this disclosure. Example networks may be designed with a flattened architecture that consists of a multi device switching system 110. Multi device switching system 110 may comprise a plurality of L2/L3 switching devices 120a-c. Switching devices 120 a-c may each be connected to a number of servers 130a-f.

In some embodiments, switching devices 120a-c may be directly linked together or (full-mess or cascade architecture) or through a switching fabric device (hub-spoke architecture) to form a virtual switch. All these switching devices may be controlled by a central controller. Routing protocols may run on the central controller as a single routing entity. All traffic may travel through the system as if switching through a single switching device. In such a switching system, a packet forwarded across switching devices 120 a-c may go through two stages of hardware lookup and forwarding, once at an ingress switching device and once at an egress switching device.

IPv6 Protocol is designed to support a much greater number of addressable nodes and more capability of addressing hierarchy with a larger address size (128 bits). With the larger IPv6 address space, there is more flexibility for assigning network prefixes and addresses. This creates the possibility for aggregation.

Figure 2:
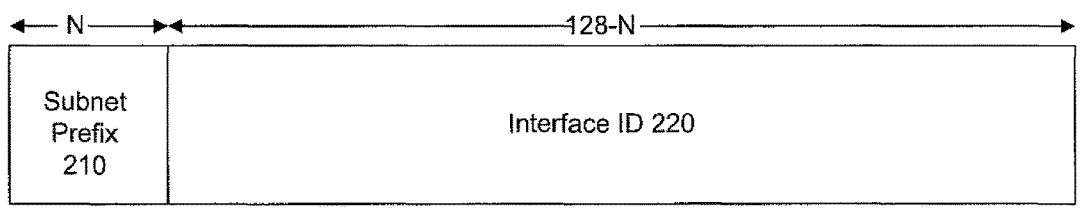
FIG. 2 illustrates the IPv6 address format.

FIG. 2 illustrates the IPv6 address format. The higher N bits may be used to store the subnet prefix 210. Subnet prefix 210 may be the subnet prefix assigned to the L3 interface. The remaining 128-N bits may be used to store the interface ID 220. Interface ID 220 may be used to identify the host connected to the L3 interface.

Figure 3:
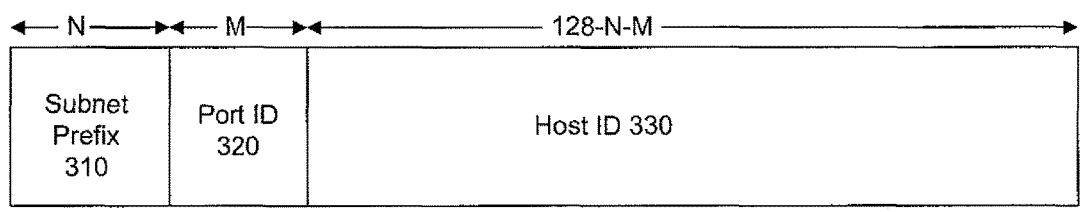
FIG. 3 illustrates an IPv6 address format according to embodiments of this disclosure.

FIG. 3 illustrates an IPv6 address format according to embodiments of this disclosure. The highest N bits may be used to store the subnet prefix 310. The next M bits may be allocated for a port ID 320. The port ID 320 may uniquely identify a particular port associated with a switching device on the network. The remaining 128-N-M bits may be used to store the host ID 330. A port prefix may be formed by combining the subnet prefix and the port ID.

Embodiments described herein may be based on the configuration that a L3 virtual interface consists of multiple L2 switch ports. Furthermore, each of the multiple L2 switch ports may share the same VLAN ID. An L2 switch port associated with a switching device may be connected to multiple hosts or VMs. The port prefix may be provisioned on a port of a switching device. The port prefix length (N+M) may be the same or different on different ports depending upon the number of hosts connected to the port.

All port prefixes associated with a VLAN interface should be summarized by the subnet prefix on the VLAN interface. All assigned host addresses associated with the port should be summarized by the port prefix configured on the switching device. In some embodiments, subnet prefixes, port prefixes, and host addresses may be assigned through a DHCP server and other network management tools.

In operating environment according to embodiments described herein, a plurality of L2 ports associated with switching devices may reside on the same VLAN. An L3 virtual interface may be configured as described above. The L2 ports may be spread across multiple switching devices. In this setting, prior systems could not employ subnet prefix aggregation as the multiple destination switching devices may be associated with the same subnet prefix.

Embodiments described herein may install a port prefix in FIB CAM tables on all switching devices except for the local switching device. A destination port index may be installed as the destination index for the port prefix. These port prefix FIB entries may be used for ingress lookup. On the egress switching device, only local neighbor entries may be installed in the FIB CAM table on the local switching device. Neighbor FIB entries may be employed for egress lookup. If both the source and destination are on the same switching device, neighbor FIB entries may be used for FIB lookup as only one FIB lookup is required. Subnet prefixes may be installed on a local switching device, where the local switching device is configured to punt the entry neighbor discovery packet to the central controller CPU for processing.

Figure 4:
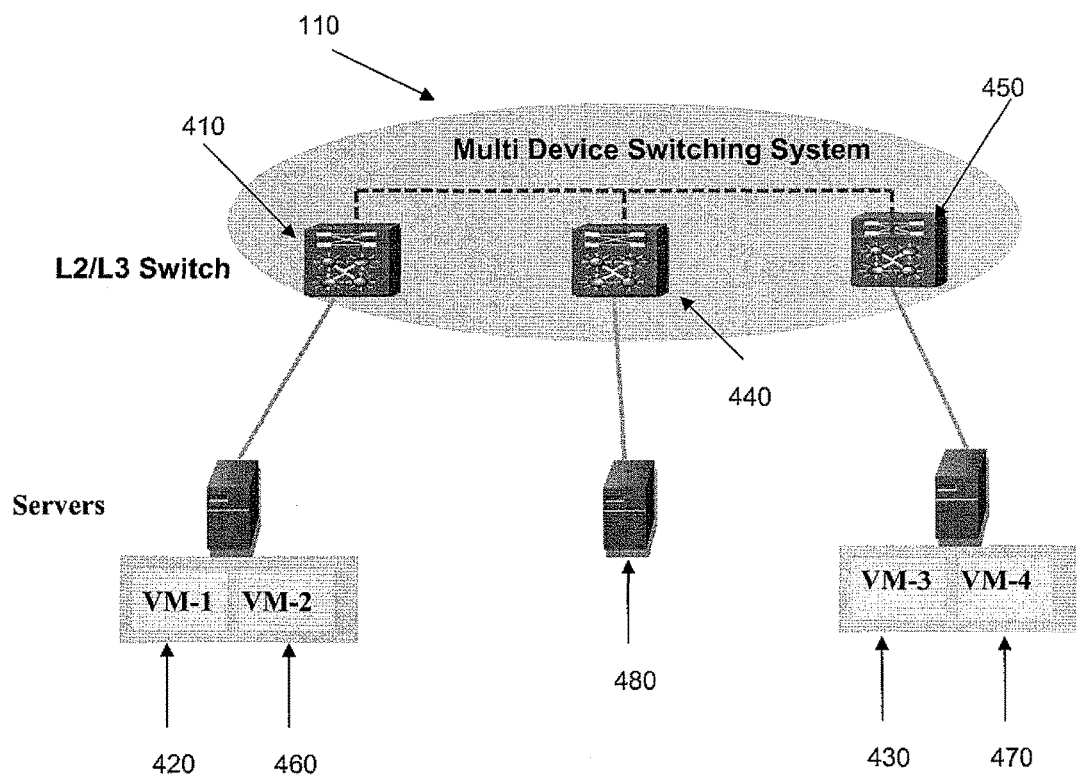
FIG. 4 illustrates example embodiments of the present disclosure.

FIG. 4 illustrates example embodiments of the present disclosure. Port prefix PP1 may be configured on a port associated with a switching device 450 connecting to VM 430 and VM 470. Port prefix PP1 may be installed in FIB CAM on switching device 410 and switching device 440. If an IPv6 packet comes from VM 420 with a destination of VM 430, it may arrive at switching device 410. The L3 ingress lookup may hit port prefix PP1 with a destination index pointing to switch device 450.

Without L2 rewrite, the frame is forwarded to egress at switch device 450. At this stage the MAC of the destination has been discovered by the system. A L3 egress lookup may then hit the destination CAM entry for VM 430. The packet will subsequently be forwarded to VM 430. Reverse traffic may be forwarded the same way with a port prefix provisioned on switch device 410 and installed in FIB CAM on switching device 450.

On a pure L3 interface without VLAN association, the subnet prefix configured on the interface with destination port index may be installed on all other associated switch devices. A packet arriving at an ingress switch device may hit the subnet prefix. The packet may then be forwarded to the egress switch device and reach its final destination.

On an Ether-channel (LAG) interface, the subnet prefix configured on the interface with Ether-channel destination index may be installed on all other associated switch devices. A packet arriving at an ingress switch device may hit the subnet prefix. The packet may then be forwarded to a switch device depending upon an Ether-channel load balancing algorithm. The packet may then be forwarded by the egress switch device based on egress lookup.

The maximum number of hosts that may be supported by embodiments of this disclosure may be calculated via formula [1]

$$H=(F-P \times V \times S) \times S \qquad [1]$$

H represents the maximum number of hosts supported. F represents the size of the FIB. V represents the number of VLANs per port. P represents the number of ports per switching device. S represents the number of switch devices being employed. For example, with a FIB CAM size of 16,000 IPv6 entries, 100 switch devices, 48 ports per switching device, 1 VLAN per port, 1.1 million hosts may be supported.

In some embodiments, for increased scalability, the port prefix may be installed on ingress switch devices based on active traffic flows. For example, the port prefix would only be installed on those switch devices that have active traffic flow. The traffic flow may be monitored and the port prefix should be removed from the ingress switch device if traffic flow stops for a predetermined period of time. With this approach the FIB CAM size may be even smaller if hosts connected to a port device do not communicate with hosts connected to all other ports on other switch devices.

The maximum number of hosts that may be supported by embodiments of the previous paragraph may be calculated via formula [2]

$$H=(F-P \times V \times S \times C\ \%) \times S \qquad [2]$$

C % represents the percentage of active traffic flows between ports associated with active switching devices. For example, with a FIB CAM size of 16,000 IPv6 entries, 100 switch devices, 48 ports per switching device, 2 VLANs per port, with 50% active flow, 1.1 million hosts may be supported.

Embodiments of this disclosure consider the scenarios where port level aggregation may not meet the requirements of a campus or data center environment where many VLANs may be provisioned. As the port prefix should be provisioned on a per-port/per-VLAN basis, the number of port prefixes may grow as the number of VLANs per port grows. In these environments, embodiments may allocate M bits for the device ID from the interface ID space as illustrated in FIG. 5.

Figure 5:
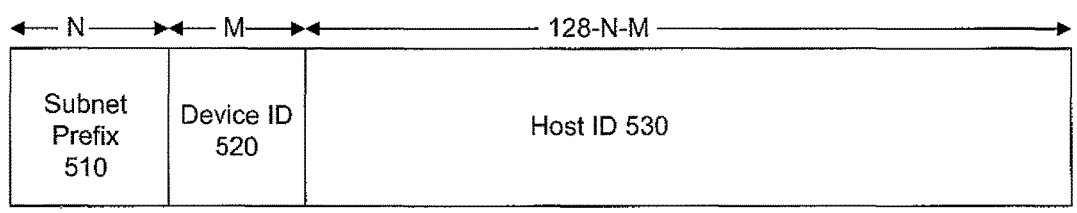
FIG. 5 illustrates an IPv6 address format according to embodiments of this disclosure.

FIG. 5 illustrates an IPv6 address format according to embodiments of this disclosure. The highest N bits may be used to store the subnet prefix 510. The next M bits may be allocated for a device ID 520. The device ID 520 may identify an individual device on the system. The remaining 128-N-M bits may be used to store the host ID 530. A device prefix may be formed by combining the subnet prefix and the device ID.

The device prefix may be provisioned on a switch device, one for each VLAN on the switch device. The device prefix is used to summarize all hosts connected to the switch device on the same VLAN. The device prefix may be installed on the FIB CAMs associated with the other switch devices for ingress lookup.

The approaches for use of the port prefix may be employed with the device prefix. However, the ingress lookup is based on the device prefix as opposed to the port prefix. The use of the device prefix also allows for a much higher degree of scalability for systems provisioned with many VLANs.

The maximum number of hosts that may be supported by embodiments of this disclosure employing the device prefix may be calculated via formula [3]

$$H=(F-V\times S)\times S \quad [3]$$

H represents the maximum number of hosts supported. F represents the size of the FIB. V represents the number of VLANs per device. S represents the number of switch devices being employed. For example, with a FIB CAM size of 16,000 IPv6 entries, 100 switch devices, 1 VLAN per device, 1.6 million hosts may be supported. Similarly, with a FIB CAM size of 16,000 IPv6 entries, 100 switch devices, 50 VLANs per device, 1.1 million hosts may be supported.

Figure 6:
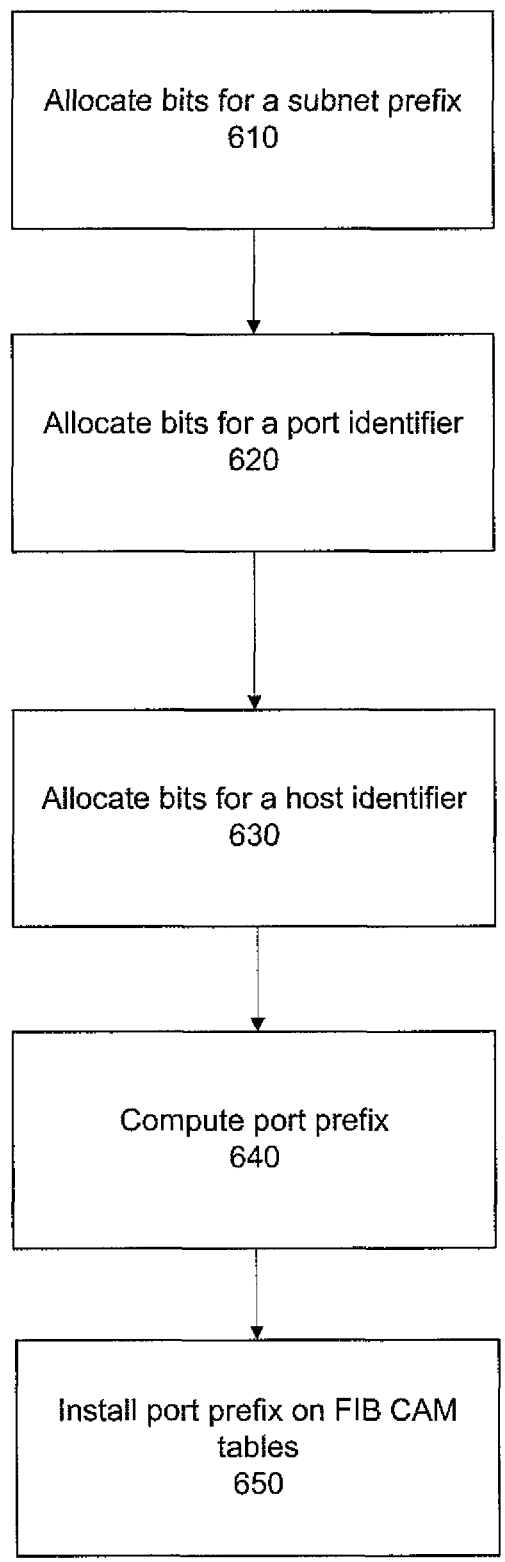
FIG. 6 is a flow chart illustrating embodiments of this disclosure.

FIG. 6 is a flow chart illustrating embodiments of this disclosure. Method 600 may begin at step 610 where a first quantity of bits in an IPv6 address may be allocated for storing a subnet prefix. Method 600 may then proceed to step 620, where a second quantity of bits in the IPv6 address may be allocated for storing a port identifier.

Method 600 may then proceed to step 630. At step 630, the remaining bits in the IPv6 address may be allocated for storing a host identifier. In some embodiments, the IPv6 address is appended to a packet transmitted across a Level-3 virtual interface comprised of a plurality of Layer-2 switch ports. Method 600 may then proceed to step 640 where a port prefix may be computed by combining the subnet prefix and the port identifier.

In some embodiments, two or more of the plurality of switching devices may share the same VLAN identification. Furthermore, at least one of the switching devices may be connected to one or more virtual machines. Method 600 may then proceed to step 650 where the port prefix may be installed in FIB CAM tables on a plurality of the switching devices. In some embodiments, all assigned host addresses associated with the port may be summarized by the port prefix.

Figure 7:
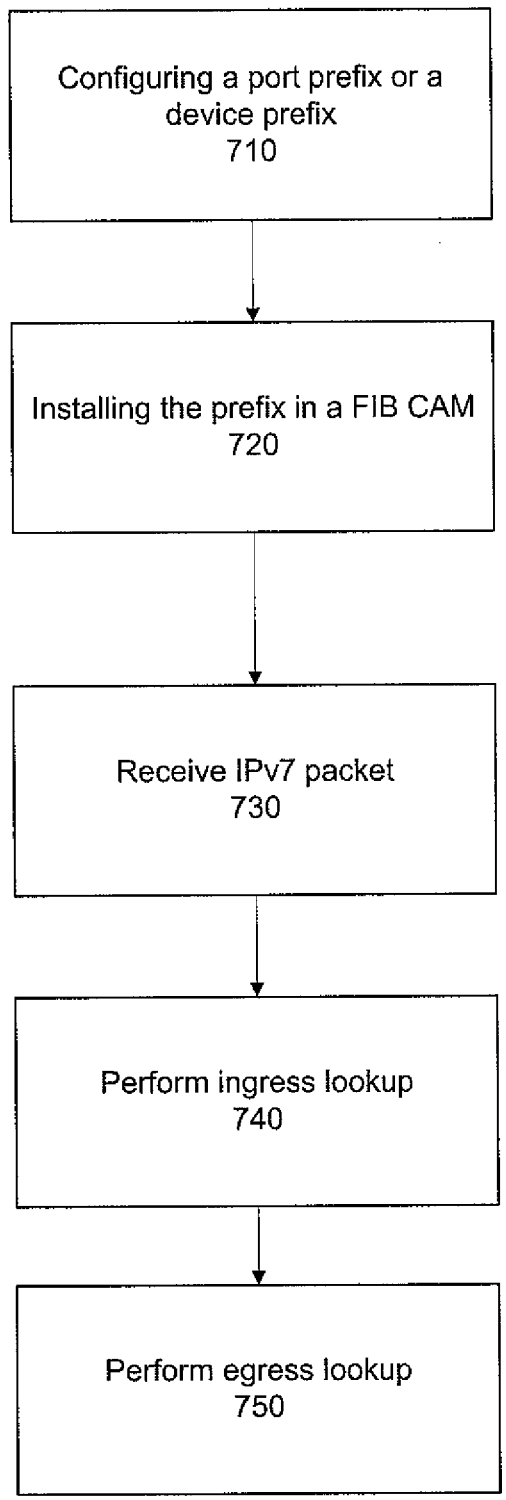
FIG. 7 is a flow chart illustrating embodiments of this disclosure.

FIG. 7 is a flow chart illustrating embodiments of this disclosure. Method 700 may begin at step 710, where one of: a port prefix and/or a device prefix is configured. The prefix is determined based on IPv6 address information as described above in regards to FIG. 3 and FIG. 5. In some embodiments, the configuration may take place on a switching device. The switching device may reside on a path between the first virtual machine and the second virtual machine.

Method 700 may then proceed to step 720. At step 720, the prefix may be installed in a FIB CAM at the ingress switching device. In some embodiments, the prefix may comprise a destination index pointing to an egress switch device. Method 700 may then proceed to step 730, where an IPv6 packet may be received from a first virtual machine addressed to a second virtual machine.

Subsequent to the receipt of the IPv6 packet, method 700 may proceed to step 740. At step 740, an ingress lookup may be performed. The ingress lookup may locate the designated prefix. In some embodiments, method 700 may proceed to step 750, where an egress lookup may be performed as the packet traverses to its destination. The egress lookup may locate a destination entry on the FIB CAM corresponding to the second virtual machine. In some embodiments, the packet may be forwarded to the egress switch device based on the results of a load balancing algorithm. In some embodiments, method 700 may be performed on an L3 interface without VLAN association.

An embodiment consistent with this disclosure may comprise an apparatus for scaling IPv6 on multiple devices. The system may comprise a processor coupled to a memory, wherein the processor is operative to determine a port prefix value based on IPv6 address information. The processor may be further configured to install the port prefix value in FIB CAM tables associated with a plurality of connected switching devices.

The processor may further be configured to use the port prefix value for ingress lookup. In some embodiments, the apparatus may be a switching device. The switching device may reside on the same VLAN as the plurality of connected switching devices. The processor may be further configured to punt an entry data packet to a central controller for processing.

Embodiments described herein disclose a distributed neighbor discovery module where all neighbor discovery operations and functionalities may be distributed to a switch device processor. Each neighbor discovery process on a switch device may run as an individual neighbor discovery router node. There may be no coordination between neighbor discovery processes occurring on different switch devices. All other traffic, including both IPv6 control traffic and data traffic destined to the router may be processed by the central controller processor.

IPv6 neighbor discovery messages may be classified as IPv6 ICMP messages with five reserved ICMP message types. The five reserved ICMP message types include router solicitation, router advertisement, neighbor solicitation, neighbor advertisement, and redirect messages. For embodiments of the present disclosure only IPv6 neighbor discovery packets should be punted to the switch device processor. Other IPv6 ICMP packets destined for the router should be punted to the central controller processor.

To distinguish these messages from other ICMP messages, a Layer-3 access-list may be employed in hardware. The access list contains a list of permitted reserved ICMP message types. In some embodiments, the access list includes message types which may be identified as "router-solicitation", "router-advertisement", "nd-ns" (neighbor solicitation), "nd-na" (neighbor advertisement), and "redirect".

The access list should be programmed in hardware with a local CPU as its destination so that packets matching with the access list would be punted to the local CPU. All other control traffic and data traffic should be punted to the central control processor along with the regular FIB entries in hardware.

Running embodiments of neighbor discovery on a switching device may be relatively simple if the VLAN is local to the switching device. Problems may arise when the VLAN is provisioned across a plurality of switching devices as there may be multiple neighbor discovery router instances exposed to a single VLAN.

However, with a global VLAN, hosts connected to different switching devices must be able to communicate as if they are on the same network segment. The hosts may share the same network prefix and use neighbor discovery protocol for router and neighbor discovery. The neighbor discovery processes may run on a number of switching devices operating as neighbor discovery router nodes.

Figure 8:
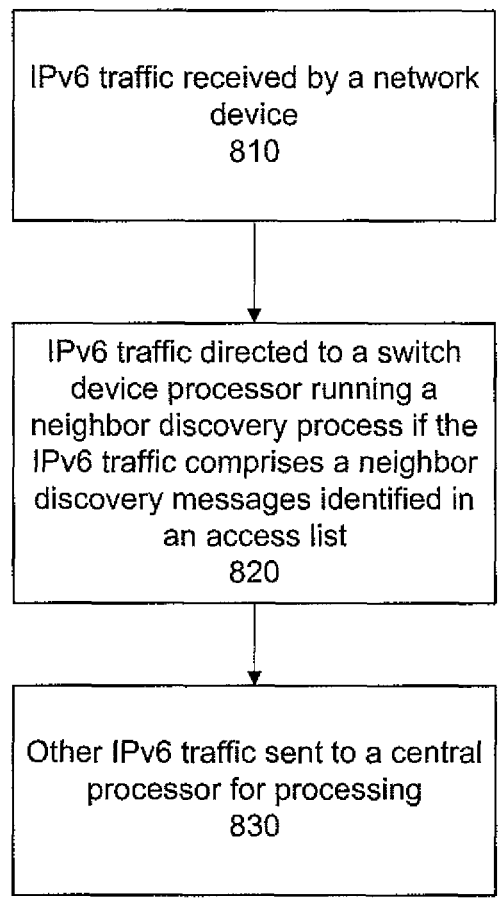
FIG. 8 is a flow chart illustrating embodiments of this disclosure.

FIG. 8 is a flow chart illustrating embodiments of this disclosure. method 800 may begin at step 810 where IPv6 traffic may be received by a network device. The IPv6 traffic may contain various type of data and messages including ICMP messages.

Method 800 may then proceed to step 820. At step 820, the IPv6 traffic may be directed to a switch device processor running a neighbor discovery process if the IPv6 traffic comprises one or more neighbor discovery messages identified in an access list.

In some embodiments, neighbor discovery messages may be identified by comparing message type values associated with the packets in the IPv6 traffic to the access list. The message type values include a plurality of: router solicitation, router advertisement, neighbor solicitation, neighbor advertisement, and redirect messages. The access list may be programmed in hardware with a local CPU associated with a switching device as its destination for identified messages.

Then, at step 830 the other IPv6 traffic may be sent to a central processor for processing.

Embodiments of the present disclosure contemplate distributed models to achieve distributed neighbor discovery through a single address model. Some embodiments have a number of neighbor discovery processes running on switching devices. Each of the neighbor discovery processes may use the same router IP address and the same router MAC address. The router MAC address may be installed in a MAC table. The router IP addresses may be installed in FIB CAM.

Multicast neighbor discovery packets may be sent from a number of hosts. For neighbor discovery packets destined to all nodes (or all routers), the packets should be accepted and handled by the local neighbor discovery process on the local switching device processor. The packets may also be flooded to other hosts through switching devices that have ports belonging to the same VLAN. The packets should not be processed by neighbor discovery processing on other switching devices.

For neighbor discovery packets destined to a solicited-node address, they should be accepted and handled by the local neighbor discovery process on the local switching device processor if the destination matches with the local solicited-node address. Otherwise, the packet should be flooded to other hosts on the same VLAN on other switching devices. These packets should not be processed by the processors associated with the other switching devices.

Similarly, multicast neighbor discovery packets may be sent from a router. In some embodiments, such packets should only be sent to hosts on the same VLAN connected to the local switching device.

In some embodiments, unicast neighbor discovery packets may be sent from host targets to the router. It may be assumed that the router MAC address has been previously resolved by the hosts. After a unicast neighbor discovery packet is received by a switching device, an L2 lookup may be performed at the switching device which should hit the router MAC address. Hitting the router MAC address may trigger an L3 lookup. The L3 lookup may hit the ACL so that the packet is punted to the switching device's CPU. Unicast packets sent from a router to a number of hosts are handled in a typical way.

In some embodiments, unicast neighbor discovery packets may be sent from host targets to a host connected to another switching device on the same VLAN. After this type of unicast neighbor discovery packet is received by a switching device. The switching device may then perform in hardware an L2 lookup that produces a miss. The packet may then be replicated and flooded to other hosts on the same VLAN using other switching devices.

Figure 9:
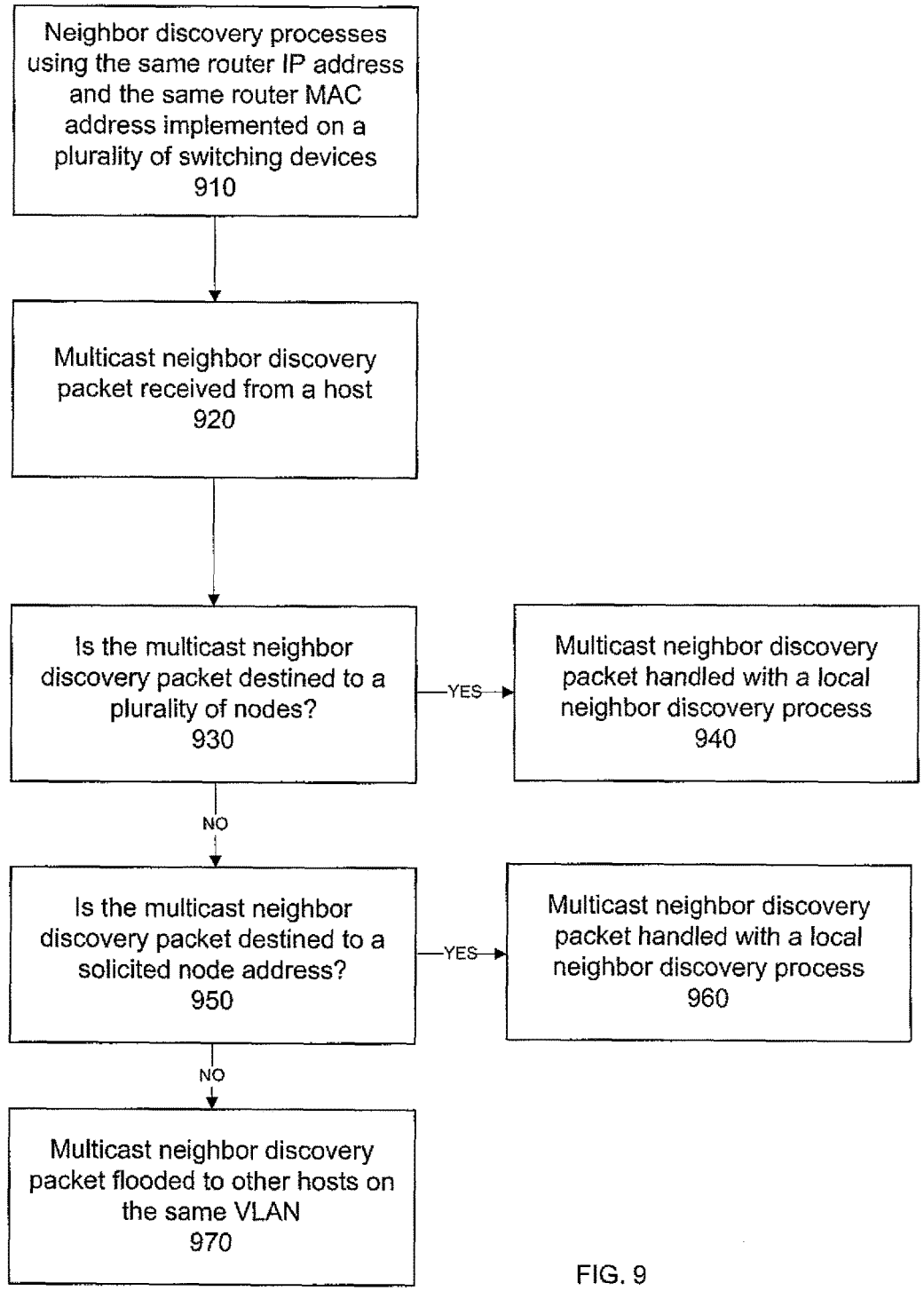
FIG. 9 is a flow chart illustrating embodiments of this disclosure.

FIG. 9 is a flow chart illustrating embodiments of the present disclosure. Method 900 may begin at step 910 where a number of neighbor discovery processes using the same router IP address and the same router MAC address may be implemented on a plurality of switching devices.

Next, at step 920 a multicast neighbor discovery packet may be received from a host. Then, at step 930 it may be determined if the multicast neighbor discovery packet is destined to a plurality of nodes. If so, method 900 proceeds to step 940 where the multicast neighbor discovery packet may be handled with a local neighbor discovery process.

If not, method 900 proceeds to step 950, where it may be determined if the multicast neighbor discovery packet is destined to a solicited node address and the multicast discovery packet destination matches the local solicited node address. If so, method 900 proceeds to step 960. At step 960, the multicast neighbor discovery packet may be handled with a local neighbor discovery process.

In some embodiments, method 900 may proceed to step 970. At step 970, the multicast neighbor discovery packet may be flooded to other hosts on the same VLAN associated with the other switching devices.

Figure 10:
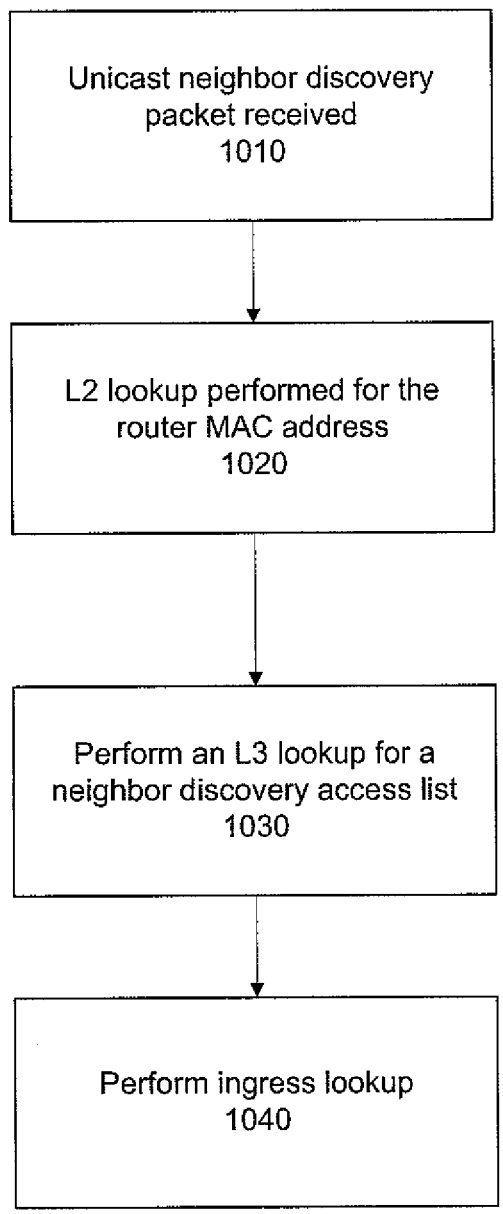
FIG. 10 is a flow chart illustrating embodiments of this disclosure.

FIG. 10 is a flow chart illustrating embodiments of the disclosure. Method 1000 may begin at step 1010 when a unicast neighbor discovery packet may be received. Method 1000 may then proceed to step 1020. At step 1020, an L2 lookup may be performed for the router MAC address.

If the router MAC address is hit, method 1000 may proceed to step 1030 and perform an L3 lookup for a neighbor discovery access list. Upon a hit on the access list, method 1000 may proceed to step 1040 and punt the unicast neighbor discovery packet to a local CPU.

In some embodiments step 1010 may comprises receiving a unicast neighbor discovery packet from a host target to a host connected to a second switching device on the same VLAN. In that case, the L2 lookup at step 1020 may produce a miss. Upon the miss, the unicast neighbor discovery packet may be replicated and flooded to other hosts on the same VLAN.

Embodiments of the present disclosure contemplate distributed models to achieve distributed neighbor discovery through a multiple address model. In the multiple address model, each neighbor discovery process running on a switching device may have a unique router IP address and a unique router MAC address.

Typically, more than one neighbor discovery process can advertise a router address to the same VLAN as if multiple routers existed on that VLAN. Hosts and virtual machines connected to the VLAN may select a router from its router list. Embodiments of the disclosure propose to suppress Router Advertisement messages from the neighbor discovery router on the switching devices. The default router may be configured on hosts (or VMs) with a management tool, such as DHCP. This may guarantee that a host (or VM) always communicates with the same switching device. This switching device would normally be the switching device the host (or VM) is directly connected to. Such a solution requires minimal implementation effort to configure existing systems.

When multicast neighbor discovery packets are sent from hosts, router advertisement packets sent from host will be dropped. Neighbor Solicitation packets sent from the host should be punted to the switching device CPU if the destination address matches with the local solicited-node multicast address. There may exist some embodiments where the packet may not come from a directly connected host. This scenario may exist for example, in instances of VMotion or system misconfiguration. As such, the switching device should allow for neighbor solicitation packets from hosts which are not directly connected.

In some embodiments, multicast neighbor discovery packets may be sent from a router. Again, router advertisement messages should be suppressed. Neighbor solicitation messages may be flooded to VLAN as usual. If the VLAN crosses multiple switching devices, the neighbor solicitation messages should be flooded to all switching devices that contain members of the VLAN.

In some embodiments, unicast neighbor discovery packets may be sent from host targets to the router. These packets may have the router MAC as the destination MAC. These unicast neighbor discovery packets should be punted to the neighbor discovery processes running on the local switch device as usual. Similar to above, the switching device should allow for neighbor solicitation packets from hosts which are not directly connected. Unicast packets sent from a router to a number of hosts are handled in a typical way.

In some embodiments, unicast neighbor discovery packets may be sent from host targets to a host connected to another switching device on the same VLAN. After this type of unicast neighbor discovery packet is received by a switching device. The switching device may then perform in hardware an L2 lookup that produces a miss. The packet may then be replicated and flooded to other hosts on the same VLAN using other switching devices.

Figure 11:
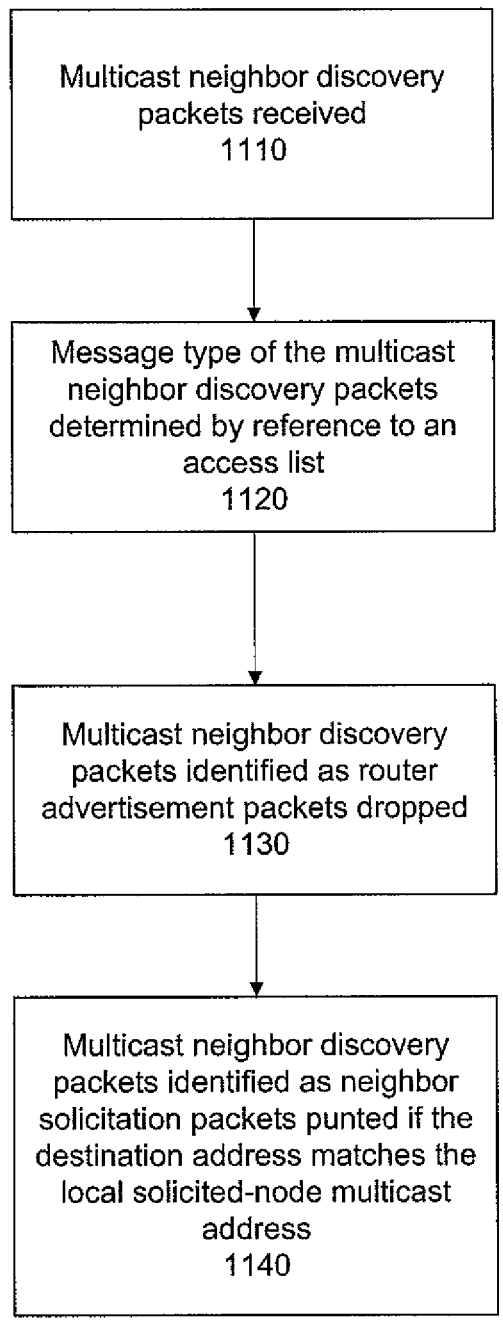
FIG. 11 is a flow chart illustrating embodiments of this disclosure.

FIG. 11 is a flow chart illustrating embodiments of this disclosure. Method 1100 may start at step 1110 where multicast neighbor discovery packets may be received. After receipt, method 1100 may proceed to step 1120. At step 1120, the message type of the multicast neighbor discovery packets may be determined by reference to an access list.

After determining the message type, method 1100 may proceed to step 1130 where multicast neighbor discovery packets identified as router advertisement packets may be dropped. Method 1100 may then proceed to step 1140 where multicast neighbor discovery packets identified as neighbor solicitation packets to a local CPU are punted if the destination address matches the local solicited-node multicast address.

Figure 12:
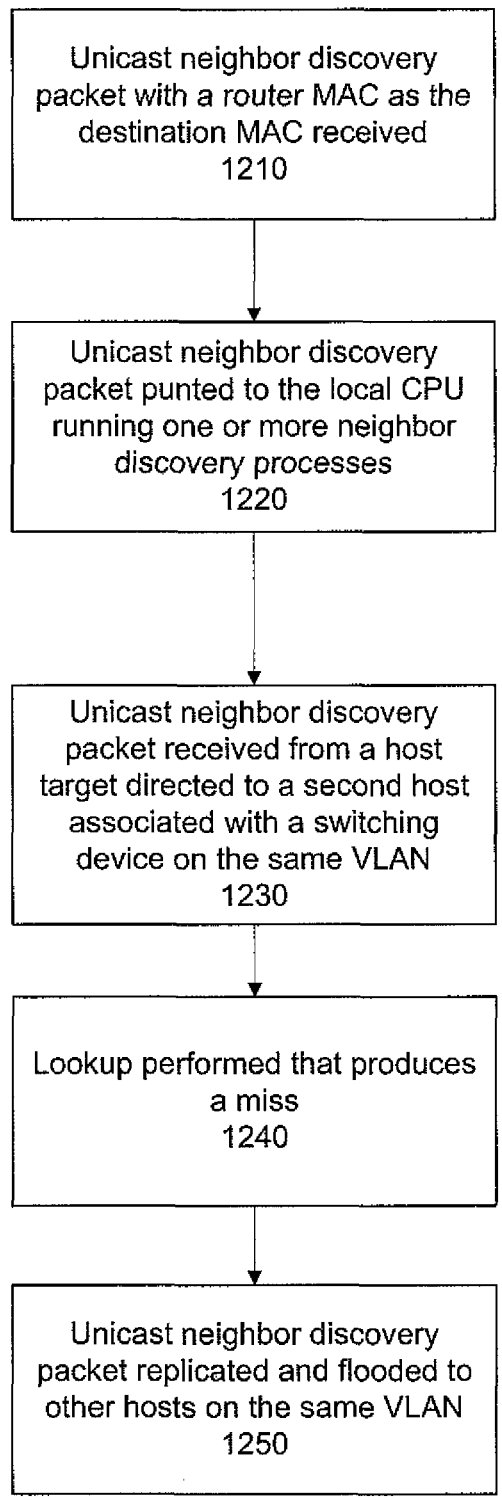
FIG. 12 is a flow chart illustrating embodiments of this disclosure.

FIG. 12 is a flow chart illustrating embodiments of this disclosure. Method 1200 may start at step 1210 where a unicast neighbor discovery packet with a router MAC as the destination MAC may be received. Upon receipt of the unicast neighbor discovery packet, method 1200 may proceed to step 1220 where the unicast neighbor discovery packet may be punted to the local CPU running a neighbor discovery process.

Method 1200 may then proceed to step 1230. At step 1230, a unicast neighbor discovery packet may be received from a host target directed to a second host associated with a switching device on the same VLAN. Method 1200 will then proceed to step 1240 where a lookup may be performed that produces a miss.

When the lookup results in a miss, method 1200 may proceed to step 1250. At step 1250, the unicast neighbor discovery packet may be replicated and flooded to other hosts on the same VLAN.

Figure 13:
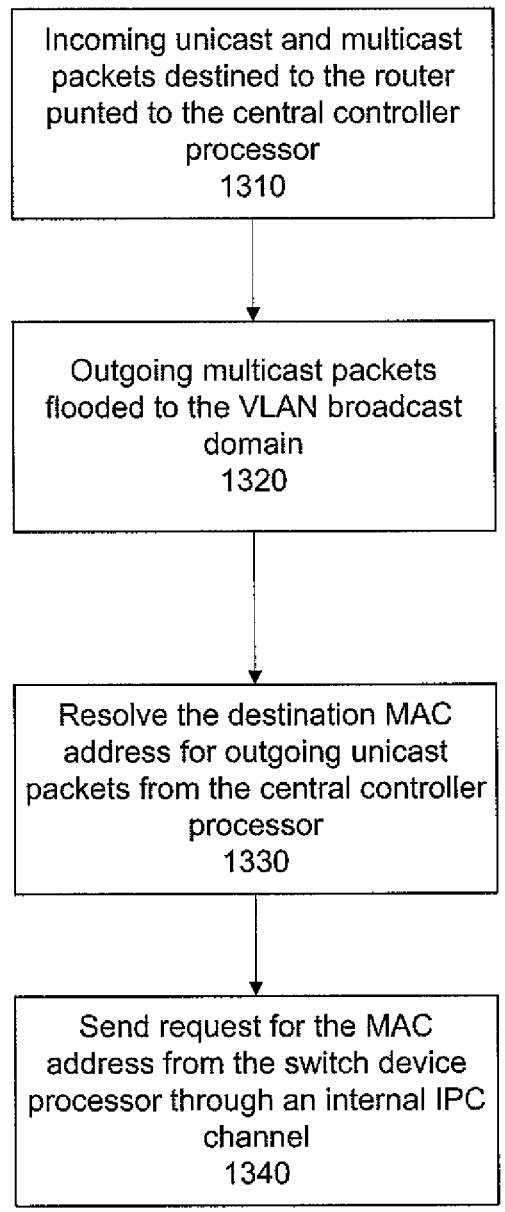
FIG. 13 is a flow chart illustrating embodiments of this disclosure.

In embodiments described herein, the switching device processor should not process any packets other than neighbor discovery packets. All other packets should be handled by the central controlling processor as described in regards to FIG. 13. FIG. 13 illustrates other packet handling according to embodiments described herein. Method 1300 may begin at step 1310 where all incoming unicast and multicast packets destined to the router are punted to the central controller processor.

Method 1300 may proceed to step 1320. At step 1320, all outgoing multicast packets may be flooded to the VLAN broadcast domain. Method 1300 may then proceed to step 1330. At step 1330, the outgoing unicast packets from the central controller processor need to resolve the destination MAC address. By searching in the device/port prefix table, the switch device processor may be found through which the destination may be reached.

The method may proceed to step 1340, where a send request for the MAC address to the switch device processor through an internal IPC channel. When the MAC address is learned from the reply message, it may be stored in a Neighbor Cache on the central controller processor. The MAC address may be used for sending the current and future unicast packets to that destination.

Figure 14:
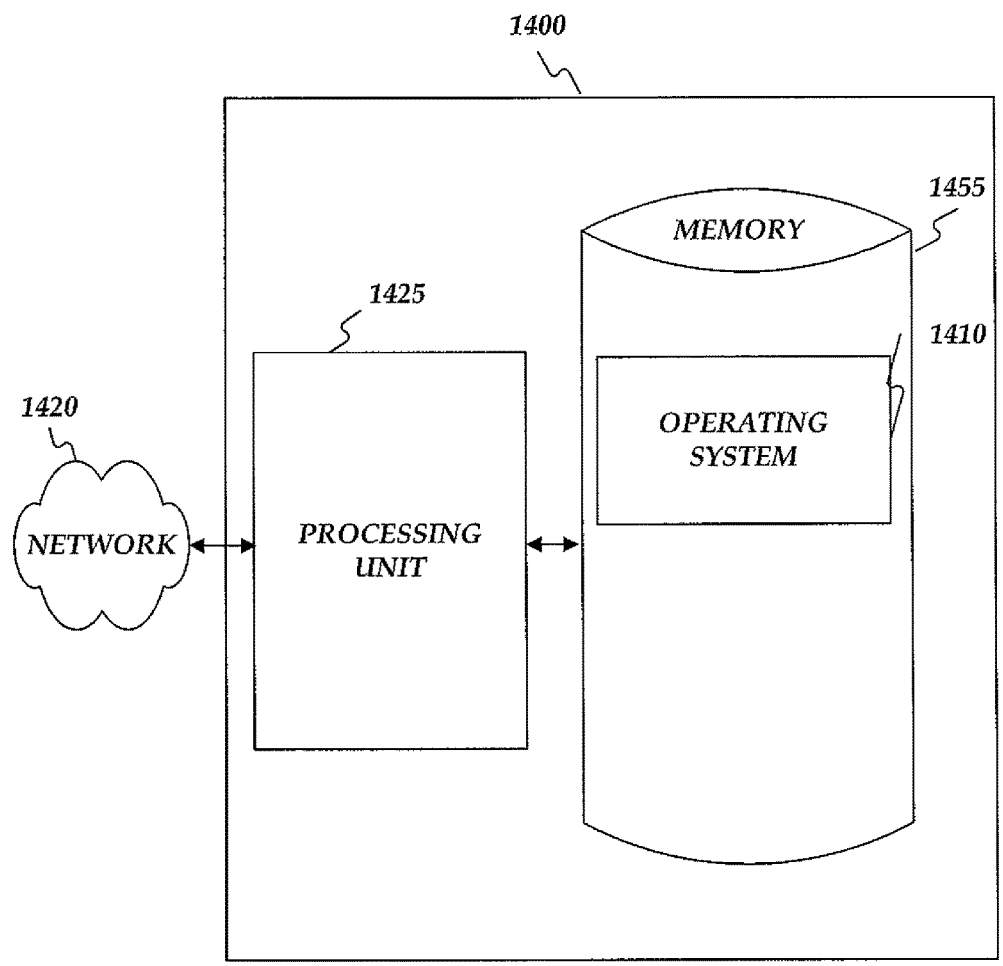
FIG. 14 is a block diagram of a computing network device.

FIG. 14 illustrates a network device, such as computing device 1400. Computing device 1400 may include processing unit 1425 and memory 1455. Memory 1455 may include software configured to execute application modules such as an operating system 1410. Computing device 1400 may execute, for example, one or more stages included in the methods as described above. Moreover, any one or more of the stages included in the above describe methods may be performed on any element shown in FIG. 14.

Computing device 1400 may be implemented using a personal computer, a network computer, a mainframe, a computing appliance, or other similar microcomputer-based workstation. The processor may comprise any computer operating environment, such as hand-held devices, multi-processor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

What is claimed is:

1. A method comprising:
    receiving a first IPv6 traffic at a first switch device of a multi device switching system comprising a plurality of switch devices, the plurality of switch devices linked together through a switching fabric and configured to operate as a single routing entity, wherein each of the plurality of switch devices is associated with a local switch device processor, and wherein the multi device switching system is controlled with a central controller comprising a central controller processor;
    determining, at the first switch device, that the first IPv6 traffic comprises a neighbor discovery message, wherein determining that the first IPv6 traffic comprises the neighbor discovery message comprises:
        comparing a message type associated with the first IPv6 traffic with a predetermined list of reserved internet control message protocol (ICMP) message types, wherein each of the reserved ICMP message types on the predetermined list are classified as comprising neighbor discovery messages, and
        determining the first IPv6 traffic comprises the neighbor discovery message when the message type associated with the first IPv6 traffic matches with one of the reserved ICMP message types on the predetermined list, wherein the predetermined list is stored at the first switch device;
    punting the first IPv6 traffic to a first local switch device processor associated with the first switch device only when the first IPv6 traffic comprises the neighbor discovery message;
    receive a second IPv6 traffic at the first switch device;
    determining, at the first switch device, that the second IPv6 traffic does not comprise the neighbor discovery message; and
    punting, when the second IPv6 traffic does not comprise the neighbor discovery message, the second IPv6 traffic to the central controller processor.

2. The method of claim 1, wherein comparing the first IPv6 traffic comprises comparing message type values associated with packets in the first IPv6 traffic to the predetermined list.

3. The method of claim 1, wherein the predetermined list of the reserved ICMP message types comprises: a router solicitation message, a router advertisement message, a neighbor solicitation message, a neighbor advertisement message, and a redirect message.

4. The method of claim 1, wherein the predetermined list is programmed in a hardware with the first local switch device processor associated with the first switch device as its destination for identified messages.

5. The method of claim 4, wherein the plurality of switch devices are provisioned on a same virtual local area network (VLAN).

6. The system of claim 1, wherein the predetermined list is programmed in a hardware with the first local switch device processor associated with the first switch device as its destination for identified messages.

7. The system of claim 6, wherein the plurality of switch devices are provisioned on a same virtual local area network (VLAN).

8. An apparatus comprising:
    a memory; and
    a processor coupled to the memory, wherein the processor is operative to:
        receive a first IPv6 traffic at a first switch device of a multi device switching system comprising a plurality of switch devices, the plurality of switch devices linked together through a switching fabric and configured to operate as a single routing entity, wherein each of the plurality of switch devices is associated with a local switch device processor, and wherein the multi device switching system is configured to be controlled with a central controller comprising a central controller processor;
        determine that the first IPv6 traffic comprises a neighbor discovery message, wherein the processor being configured to determine that the first IPv6 traffic comprises the neighbor discovery message comprises the processor being configured to:
            compare a message type associated with the first IPv6 traffic with a predetermined list of the reserved internet control message protocol (ICMP) message types, wherein the reserved ICMP message types are classified as comprising neighbor discovery messages, and
            determining the first IPv6 traffic comprises the neighbor discovery message when the message type associated with the first IPv6 traffic matches with one of the reserved ICMP message types on the predetermined list;
        punt the first IPv6 traffic to a first local switch device processor associated with the first switch device only when the first IPv6 traffic comprises the neighbor discovery message;
        receive a second IPv6 traffic at the first switch device;
        determine, at the first switch device, that the second IPv6 traffic does not comprises the neighbor discovery message; and
        punt, when the second IPv6 traffic does not include the neighbor discovery message, the second IPv6 traffic to the central controller processor.

9. The apparatus of claim 8, wherein the neighbor discovery message comes from a host not directly connected to the first switch device comprising the first local switch device processor.

10. The apparatus of claim 8, wherein the processor is further operative to flood neighbor solicitation packets to all switching devices that contain members of a VLAN.

11. The apparatus of claim 10, wherein all packets that are not neighbor discovery packets are handled by the central controller processor.

12. The apparatus of claim 11, wherein the processor is further operative to:
    punt all incoming unicast and multicast packets destined to a router to the central controller processor;
    flood all outgoing multicast packets to a VLAN broadcast domain;
    resolve a destination MAC address for all outgoing unicast packets; and reference a device/port prefix table to locate a switching device processor.

13. The apparatus of claim 8, wherein the processor is further operative to:
   receive a unicast neighbor discovery packet with a router MAC as the destination MAC; and
   punt the unicast neighbor discovery packet to the first local switch device processor running a neighbor discovery process.

14. The apparatus of claim 8, wherein the processor is further operative to:
   receive a unicast neighbor discovery packet from a host target directed to a second host associated with a switching device on the same VLAN;
   perform a lookup that produces a miss;
   replicate the unicast neighbor discovery packet; and
   flood the replicated packets to other hosts on the same VLAN.

15. The apparatus of claim 8, wherein the memory further comprises a neighbor discovery access list comprising a list of acceptable neighbor discovery message types.

16. A system comprising:
   a plurality of switch devices linked together through a switching fabric to form a multi-device switching system configured to operate as a single routing entity, wherein each of the plurality of switch devices is associated with a local switch device processor, wherein the multi device switching system is controlled with a central controller comprising a central controller processor, and wherein a first switch device of the plurality of switch devices is configured to:
      receive a first IPv6 traffic;
      determine that the first IPv6 traffic comprises a neighbor discovery message, wherein the first switch device being configured to determine that the first IPv6 traffic comprises the neighbor discovery message comprises the first switch device configured to:
         compare a message type associated with the first IPv6 traffic with a predetermined list of the reserved internet control message protocol (ICMP) message types, wherein the reserved ICMP message types are classified as comprising neighbor discovery messages, and
         determining the first IPv6 traffic comprises the neighbor discovery message when the message type associated with the first IPv6 traffic matches with one of the reserved ICMP message types on the predetermined list;
      punt the first IPv6 traffic to a first local switch device processor associated with the first switch device only when the first IPv6 traffic comprises the neighbor discovery message;
      receive a second IPv6 traffic;
      determine that the second IPv6 traffic does not comprises the neighbor discovery message; and
      punt, when the second IPv6 traffic does not include the neighbor discovery message, the second IPv6 traffic to the central controller processor.

17. The system of claim 16, wherein the first switch device being configured to compare the first IPv6 traffic comprises the first switch device configured to compare message type values associated with packets in the first IPv6 traffic to the predetermined list.

18. The system of claim 16, wherein the predetermined list of the reserved ICMP message types comprises: a router solicitation message, a router advertisement message, a neighbor solicitation message, a neighbor advertisement message, and a redirect message.

* * * * *